United States Patent Office 3,379,695
Patented Apr. 23, 1968

3,379,695
PROCESS FOR THE PREPARATION OF POLY-
AMIDES IN FINELY GRAINED FORM
Wolfgang Wolfes, Witten-Bommern, Gustav Renckhoff,
Witten-Ruhr, and Hans-Leo Huelsmann, Witten-Rud-
inghausen, Germany, assignors to Chemische Werke
Witten G.m.b.H., Witten-Ruhr, Germany
No Drawing. Filed Dec. 16, 1964, Ser. No. 418,883
Claims priority, application Germany, Dec. 17, 1963,
C 31,683; Aug. 5, 1964, C 33,573
8 Claims. (Cl. 260—78)

ABSTRACT OF THE DISCLOSURE

A process for the preparation of polyamides in finely grained form which comprises reacting a diester of a terephthalic or isophthalic acid, or substituted derivative thereof, with a primary diamine in approximately equivalent amounts with intensive stirring in an inert solvent for the reactants at temperatures of from about 20° to 150° C. to give a preliminary condensate insoluble in said solvent and subsequently recondensing the preliminary condensate by heating it at about 170° to 350° C. The solvent may be replaced by a non-solvent for the polyamide during the recondensation by adding said non-solvent to the reaction mixture as the solvent distills off.

---

This invention relates to the preparation of polyamides. More particularly, it relates to a process for the preparation of polyamides of iso- and terephthalic acid. Even more particularly, the invention relates to a process for the preparation of polyamides of iso- and terephthalic acid in finely grained form.

It has been known to condense isophthalic acid alone, or a mixture of iso- and terephthalic acids, with diamines over the amine salts in the melt to give polyamides, i.e., as far as these melt below 300° C. However, when working with this process, a vacuum of about 0.1 to 1 torr must be employed toward the end of the condensation. But the melting viscosities of these polyamides are generally so high that stirring of the melt becomes extremely difficult or even impossible, and difficulties arise when draining of the condensation vessel is carried out. For this reason, the condensation frequently must be interrupted before the desired degree of polymerization has been reached.

The melting condensation technique cannot be employed for the preparation of polyhexamethyleneterephthalamide, which is highly crystalline and extremely difficultly soluble and which has a melting and decomposition point of approximately 350° C., since, as can be seen, the melting and decomposition points practically coincide.

While it is known to prepare polyhexamethyleneterephthalamide by means of an interface condensation from hexamethylenediamine and terephthalic acid dichloride, approximately five liters of solvent are required for the preparation of 10 grams of polyamide. Thus, application of this process is hardly practical because of the poor economics thereof.

One of the objects of the present invention is to provide an improved process for the preparation of polyamides of iso- and terephthalic acid which overcomes the disadvantages and deficiencies of the methods mentioned hereinabove.

Another object of the present invention is to provide a process for the preparation of polyamides of iso- and terephthalic acid in finely grained form which may be carried out in an efficacious and economical manner.

A further object of the invention is to provide a process that yields the said polyamides of iso- and terephthalic acid with an assured desired degree of polymerization.

A still further object of the invention is to provide a process for the preparation of polyamides of iso- and terephthalic acid in finely grained form which may be carried out easily and simply and which avoids the aforementioned problems of the prior art processes.

These and other objects of the present invention will become apparent to those skilled in the art from a reading of the following specification and claims.

In accordance with the present invention, it has been found that polyamides of iso- and terephthalic acid or mixtures of these two acids or derivatives of iso- and terephthalic acid or mixtures thereof may be obtained in a finely grained and easily workable form by reacting the diesters of these acids, and/or the diesters of iso- and/or terephthalic acid submitted by one or several lower alkyl groups or by one or two halogen atoms, derived from reaction with phenol, or phenols substituted with one or several lower alkyl groups, with approximately equivalent amounts of a primary aliphatic or aralkyl diamine at temperatures of from about 20° to 150° C. in the presence of a solvent. The reaction between the diester and the diamine is carried out with intensive stirring, and the thus resulting suspension of preliminary condensate is subsequently recondensed by heating to a higher temperature which is closely under the melting range of the polyamide. This higher temperature is generally within the range of from about 170° to 350° C. The recondensation is continued until the desired degree of polymerization has been reached. The recondensation may be carried out by using pressure, if desired, or by exchanging a higher boiling non-solvent for the polyamide for the original solvent used.

The allowable upper temperature limit for the subsequent condensation or recondensation is dependent upon the lower limit of the melting range of the polyamide since, otherwise, the polyamide particles will stick together, prohibiting the obtaining of a powdery product. This temperature limit may be easily determined by a preliminary test. The degree of polymerization may be varied by changing the temperature and the time of reheating, and molecular weights corresponding to a relative solution viscosity of 1.8 are required in order to obtain polyamides having usable and workable properties.

After the condensation has been completed, the finely grained polyamide is separated from the suspension and washed with a readily volatile agent, such as methanol. Thereafter, a further treatment may be carried out in a suitable apparatus, for example, a tumbler drier, at an increased temperature, with the possible use of a vacuum, in order to remove the last traces of adhering more volatile substances.

The diphenyl esters of iso- and/or terephthalic acid, and/or the corresponding esters of iso- and/or terephthalic acid substituted by one or several lower alkyl groups or by one or two halogen atoms, are particularly preferred in the process of the present invention. However, it is also possible to use the esters of these acids prepared from lower alkyl-substituted phenols. The term "lower alkyl" is meant to refer to alkyl groups containing less than five carbon atoms, such as methyl-, ethyl-, propyl-, butyl-, etc. With both the iso- and terephthalic acid derivatives and the phenol derivatives, there may be more then one alkyl group attached to the aromatic ring, such as the dimethyl, trimethyl, tetramethyl, diethyl, tetraethyl, tributyl, etc. derivatives. Halogen-substituted derivatives include those substituted by chloro-, bromo- and fluoro- in the aromatic ring. One or two halogens, the same or different, may be contained in the ring, such as dichloro-, dibromo-, difluoro-, chlorofluoro-, chlorobromo-, monochloro-, monobromo-, etc. derivatives.

Thus, besides phenol, examples of alkyl-substituted phenols which may be used to form the ester function of the compound to be reacted with the diamine include the isomeric cresols, xylenols, tert-butylphenols, etc. Moreover, in addition to iso- and terephthalic acid, compounds, such as methylterephthalic acid, methylisophthalic acid, tert-butylisophthalic acid, chloroisophthalic acids, dichloroterephthalic acid, etc. may be used as the acid component in forming the diesters. The diesters can be prepared according to conventional procedures. When using non-substituted diaryl esters together with diaryl esters having nuclear substituents in preparing the polyamides, the quantitative ratio thereof may be varied as desired within a wide range.

Any of the primary aliphatic or aralkyl diamines customarily used for the preparation of polyamides may be used as the diamine component in the process of the present invention. These include, for example, tetramethylenediamine, hexamethylenediamine, decamethylenediamine, xylylenediamine, etc.

When using mixtures of diphenyl isophthalate and diphenyl terephthalate with hexamethylenediamine, a ratio of 60 to 80 mole percent of diphenyl isophthalate and 40 to 20 mole percent of diphenyl terephthalate is preferred.

The diester component and the diamine component are preferably reacted in approximately equivalent amounts. By equivalent amounts is meant that the number of ester groups to be reacted is approximately equal to the number of amino groups to be reacted.

Benzene is particularly suitable as the solvent for the primary reaction of the diester with the diamine, but other aromatic hydrocarbons, such as toluene, xylene, tetralin, biphenyl, etc., may also be employed. The subsequent further condensation or recondensation of the suspension of preliminary condensate at increased temperatures may take place in the same solvent. However, when employing low boiling solvents, the use of a pressure apparatus is required if the temperature of the recondensation is above the corresponding boiling point of the solvent. It may, therefore, be advantageous to exchange for the originally used solvent another solvent which is high-boiling and, in that case, it is expedient to choose a solvent whose boiling range coincides with the desired temperature of recondensation.

Thus, in accordance with the process of the present invention, it is advantageous to proceed in such a manner that the suspension of the preliminary condensate is gradually heated to a higher temperature and that a new higher-boiling solvent is added to the reaction mixture in the same proportion as the originally employed solvent distills off. In this regard, the added high-boiling solvent is no longer restricted to aromatic hydrocarbons. The only condition to be met with this new solvent is that it be a non-solvent for the polyamide which has been formed. Thus, in addition to the aforementioned aromatic hydrocarbons, aliphatic hydrocarbons, for example, corresponding paraffin fractions may be utilized.

Exemplary thereof are mixtures of normal paraffins having an average chain length of 12 to 14 carbon atoms. Such paraffins can be made by the "Fischer-Tropsch-Synthesis." In the same way corresponding paraffin fractions from mineral oil may be utilized.

Because of their powdery nature, the attained polyamides may be dissolved in conventional polyamide solvents, such as phenol/tetrachloroethane, etc., and therefore further treatment thereof is quite easy and simple. On the other hand, they may be employed at once for processing on injection molding devices or extrusion presses, depending on the desired needs therefor.

The following examples are given merely as illustrative of the present invention and are not to be considered as limiting thereof.

The relative solution viscosity of the polyamides indicated in the following examples for the purpose of characterizing the degree of polymerization thereof was determined by measuring the viscosity of a 1 percent polymer solution (1 gram of substance to 100 cc. of solution) in phenol/tetrachloroethane (60/40) in an Ostwald Viscosimeter at a temperature of 25° C.

Example 1.—Preparation of polyhexamethyleneisophthalamide/terephthalamide (75/25)

47.7 grams of diphenyl isophthalate (0.15 mole) and 15.9 grams of diphenyl terephthalate (0.05 mole) are dissolved in 300 ml. of benzene at 80° C. in a 750 ml. three-necked flask equipped with stirrer, reflux cooler, dropping funnel and thermometer. 23.2 grams of hexamethylenediamine (0.2 mole) dissolved in 50 ml. of benzene are added thereto dropwise over a period of approximately 30 minutes at the boiling temperature of the benzene and while the reaction mixture is intensively stirred. Stirring is continued for approximately 4 to 6 hours at reflux temperature. Within about one hour, a fine-grained polyamide is precipitated from the initially only slightly turbid or clouded solution. The degree of polycondensation is still too low since the product only has a specific viscosity number of 0.4. The contents of the flask are thereafter completely transferred into a stirring autoclave and heated under a nitrogen atmosphere to 175° C. for 4.5 hours. After cooling, the still fine-grained polyamide is suctioned off, washed with methanol and dried. Any remaining adhering volatile constituents are removed by heating to 190° C. under vacuum.

The relative solution viscosity of the polyamide product is 2.9.

The mixed polyamide may be melted down at 275° C. to a tough, transparent mass.

Example 2.—Preparation of polyhexamethyleneisophthalamide/terephthalamide (75/25)

A preliminary condensate is prepared as described in Example 1. The batch is then heated in a stirring autoclave for 6 hours at 170° C. and thereafter for another 6 hours at 190° C.

The further treatment of the finely crumbly polycondensate is the same as that described in Example 1.

The relative viscosity of the polyamide obtained herein is 6.9.

Example 3.—Preparation of polyhexamethyleneisophthalamide/terephthalamide (75/25)

23.85 grams of diphenyl isophthalate (0.075 mole) and 7.95 grams of diphenyl terephthalate (0.025 mole) are dissolved in 400 ml. of biphenyl at 80° C. Over a period of 20 minutes, 11.6 grams of hexamethylenediamine (0.1 mole) are added thereto dropwise while stirring well. After the batch has again reacted for 4 hours at 80° C., the temperature is slowly raised to 170° C. and the recondensation is interrupted at this temperature after 5 hours. The polycondensate is suctioned off at about 100° C., washed with benzene and methanol and freed from any adhering volatile constituents by vacuum drying at 190° C.

The relative solution viscosity of the product is 2.3.

Example 4.—Preparation of polyhexamethyleneisophthalamide/terephthalamide (75/25)

23.85 grams of diphenyl isophthalate (0.075 mole) and 7.95 grams of diphenyl terephthalate (0.025 mole) are dissolved at 80° C. in a mixture of 150 ml. of benzene and 200 ml. of tetralin. 11.6 grams of hexamethylenediamine (0.1 mole) are added thereto dropwise while the reaction mixture is stirred well. Stirring is carried out for 6 hours at 80° C. Thereafter, the temperature is slowly raised to 180° C. while the benzene distills off. The distilling benzene is at that time replaced by tetralin, which is added dropwise. After a recondensation time of 3 hours at 180° C., the polycondensate is suctioned off, after cooling, and further treated as described in Example 1.

The relative viscosity of the obtained product is 2.3.

Example 5.—Preparation of polyhexamethyleneisophthalamide/terephthalamide (75/25)

The process is carried out in the same manner as that described in Example 4, except that 200 ml. of Kogasin II are employed as solvent instead of tetralin.

The relative solution viscosity of the product is 2.0.

Example 6.—Preparation of polyhexamethyleneisophthalamide/terephthalamide (50/50)

31.8 grams of diphenyl isophthalate (0.1 mole) and 31.8 grams of diphenyl terephthalate (0.1 mole) are dissolved in 300 ml. of benzene at 80° C. 23.2 grams of hexamethylenediamine (0.2 mole) dissolved in 50 ml. of benzene are added thereto dropwise over a period of 30 minutes at reflux temperature while stirring the mixture well. The preliminary condensation is interrupted at 80° C. after 6 hours. After transfer of the reaction mixture into a stirring autoclave, a recondensation is carried out for 6 hours at 220° C. Further treatment of the polycondensate is the same as that described in Example 1.

The relative solution viscosity of the product is 2.6

Example 7.—Preparation of polyhexamethyleneisophthalamide 31.8 grams of diphenyl isophthalate (0.1 mole) are initially condensed with 11.6 grams of hexamethylenediamine, as described in Example 1. The recondensation in the stirring autoclave is interrupted after 4.5 hours at 175° C. The further treatment of the polycondensate is the same as that described in Example 1.

The relative solution viscosity of the obtained product is 3.0.

Example 8.—Preparation of polyhexamethyleneterephthalamide 95.4 grams of diphenyl terephthalate (0.3 mole) are dissolved in 900 ml. of xylene at 80° C. 34.8 grams of hexamethylenediamine (0.3 mole) dissolved in 300 ml. of xylene are added thereto dropwise within 2 hours at 130° C. while intensive stirring is carried out. The preliminary condensation is interrupted after 6 hours at reflux temperature, and a subsequent recondensation is effected, after transfer of the mixture into a stirring autoclave, for another 6 hours under nitrogen at 300° C.

The further treatment of the polycondensate is the same as described in Example 1.

The relative solution viscosity of the product (measured with a 1% solution in concentrated sulfuric acid) is 1.86.

Example 9.—Preparation of polytetramethyleneisophthalamide/terephthalamide (75/25)

47.7 grams of diphenyl isophthalate (0.15 mole) and 15.9 grams of diphenyl terephthalate (0.05 mole) are dissolved in 300 ml. of benzene at the boiling temperature thereof. 17.62 grams of tetramethylenediamine (0.2 mole) dissolved in 150 ml. of benzene are added thereto dropwise over a period of 20 minutes at 80° C. while stirring well. The mixture is stirred, while boiling, for 6 hours. Thereafter, another 150 ml. of benzene are added thereto. After transfer of the contents into a stirring autoclave, a recondensation is carried out at 223° C. for 7 hours.

Further treatment of the polycondensate is the same as that described in Example 1.

The relative solution viscosity of the product is 2.09.

Example 10.—Preparation of polydecamethyleneisophthalamide/terephthalamide (80/20)

50.88 grams of diphenyl isophthalate (0.16 mole) and 12.72 grams of diphenyl terephthalate (0.04 mole) are dissolved in 300 ml. of benzene at its boiling temperature. 34.4 grams of decamethylenediamine (0.2 mole) dissolved in 100 ml. of benzene are added thereto dropwise over a period of 20 minutes at 80° C. while stirring well. The mixture is stirred while boiling, for 6 hours. Thereafter, the benzene is slowly distilled off over a period of 2 hours and thereby uniformly replaced by 400 ml. of a trimethylbenzene isomeric mixture. The temperature in the sump rises continuously to 164° C. The recondensation is carried out at this reflux temperature for another 4 hours.

The further treatment of the polycondensate is the same as described in Example 1.

The relative solution viscosity of the product is 4.77.

Example 11.—Preparation of mixed polyamide of hexamethylenediamine and ethylenediamine and isophthalic acid/terephthalic acid (75/25)

47.7 grams of diphenyl isophthalate (0.15 mole) and 15.9 grams of diphenyl terephthalate (0.05 mole) are dissolved in 300 ml. of benzene at the boiling temperature of the benzene. A mixture of 20.88 grams of hexamethylenediamine (0.18 mole) and 1.20 grams of ethylenediamine (0.02 mole) dissolved in 100 ml. of benzene is added thereto dropwise within 20 minutes and while stirring well. The mixture is stirred, while boiling, for 6 hours. The benzene is replaced by 400 ml. of diethylbenzene, as described in Example 10. The recondensation is carried out at 175° C. for another 4 hours. Further treatment of the polycondensate is carried out as described in Example 1.

The relative solution viscosity of the mixed polyamide is 2.7.

Example 12.—Preparation of mixed polyamide of hexamethylenediamine and hexahydro-p-xylylenediamine and isophthalic acid/terephthalic acid (60/40)

19.1 grams of diphenyl isophthalate (0.06 mole) and 12.7 grams of diphenyl terephthalate (0.04 mole) are dissolved in 150 ml. of benzene at the boiling temperature thereof. A mixture of 8.7 grams of hexamethylenediamine (0.075 mole) and 3.62 grams of hexahydro-p-xylylenediamine (0.025 mole) dissolved in 50 ml. of benzene is added thereto dropwise over a period of 20 minutes while the mixture is stirred well. The mixture is stirred, while boiling, for 6 hours. The benzene is replaced by 200 ml. of diethylbenzene, as described in Example 10. The recondensation is carried out at 175° C. for another 3 hours. The further treatment of the polycondensate is the same as described in Example 1.

The relative solution viscosity of the product is 2.3.

Example 13.—Preparation of mixed polyamide of hexamethylenediamine and m-xylylenediamine and isophthalic acid/terephthalic acid (50/50)

15.9 grams of diphenyl isophthalate (0.05 mole) and 15.9 grams of diphenyl terephthalate (0.05 mole) are polycondensed with a mixture of 8.12 grams of hexamethylenediamine (0.07 mole) and 4.08 grams of m-xylylenediamine (0.03 mole) under the same conditions as described in Example 12. Further treatment of the polycondensate is carried out in the same manner as described in Example 1.

The relative solution viscosity of the obtained final product is 2.3.

Example 14.—Preparation of polydecamethyleneisophthalamide 34.6 grams of di-m-cresyl isophtalate (0.1 mole) are dissolved in 150 ml. of benzene at the boiling temperature thereof. 17.2 grams of decamethylenediamine (0.1 mole) dissolved in 80 ml. of benzene are added thereto dropwise over a period of 20 minutes at 70° C. while stirring well. The mixture is stirred, while boiling, for 3 hours. The benzene is replaced by 200 ml. of a trimethylbenzene isomeric mixture, as described in Example 10. The recondensation is carried out at 164° C. for another 4 hours.

The further treatment of the polycondensate is the same as described in Example 1.

The relative solution viscosity of the product is 3.15.

Example 15.—Preparation of polydecamethyleneisophthalamide

In a manner analogous to the process described in Example 14, 37.4 grams of di-3,4-xylenyl isophthalate (0.1 mole) are polycondensed with 17.2 grams of decamethylenediamine.

The relative solution viscosity of the product obtained is 2.34.

Example 16.—Preparation of polyhexamethylene-methylterephthalamide 32.2 grams of methylterephthalic acid diphenyl ester (0.1 mole) are dissolved in 150 ml. of benzene in a 500 ml. three-necked flask equipped with stirrer, reflux cooler, thermometer and gas inlet tube. 11.6 grams of hexamethylenediamine (0.1 mole) dissolved in 50 ml. of benzene are added thereto dropwise within 10 minutes at 80° C. while stirring well and while passing nitrogen thereover as a protective gas. Stirring is continued for another hour at the boiling temperature of the benzene. A voluminous powdery deposit is thereby precipitated. Thereafter, the benzene is slowly distilled off under continued active stirring, while the same amount of dodecylbenzene is simultaneously dropped in. The temperature is slowly raised, at that time, to 196° C. The recondensation is carried out at that temperature for another 4 hours. After the reaction mixture has cooled, the polyamide powder is suctioned off over a filter, washed thoroughly with methanol and dried. Any remaining adhering traces of volatile constituents are removed by heating to 250° C. under vacuum. The polyamide powder is not altered thereby.

The relative solution viscosity of the product is 2.34.

Example 17.—Preparation of polyhexamethylene-2,5-dichloroterephthalamide 38.7 grams of 2,5-dichloroterephthalic acid diphenyl ester (0.1 mole) are polycondensed with 11.6 grams of hexamethylenediamine (0.1 mole), as described in Example 16. The further treatment of the finely crumbly polyamide is the same as that described in Example 16.

The relative solution viscosity of the product is 2.66.

Example 18.—Preparation of mixed polyamide of polyhexamethylene-tert-butylisophthalamide and polyhexamethyleneterephthalamide 9.35 grams of tert-butylisophthalic acid diphenyl ester (0.025 mole) and 7.95 grams of terephthalic acid diphenyl ester (0.025 mole) are dissolved in 150 ml. of diethylbenzene. A solution of 5.8 grams of hexamethylenediamine (0.05 mole) in 50 ml. of diethylbenzene is added thereto dropwise within 10 minutes at a temperature of 90° C. while stirring well under a nitrogen atmosphere. The reaction mixture is thereupon slowly heated to 178° C. The recondensation is carried out at this temperature for 5 hours.

The further treatment of the precipitated polyamide powder is the same as that described in Example 16.

The relative solution viscosity of the product is 2.06.

The invention being thus described, it will be obvious that the same may be varied in many ways. Such variations are not to be regarded as a departure from the spirit and scope of the invention and all such modifications are intended to be included within the scope of the following claims.

We claim:
1. A process for the preparation of polyamides of iso-phthalic acid, terephthalic acid and mixtures thereof in finely grained form which comprises reacting a diester selected from the group consisting of diphenyl diesters and alkyl-substituted diphenyl diesters of an acid selected from the group consisting of isophthalic acid, terephthalic acid, alkyl-substituted isophthalic acids, alkyl-substituted terephthalic acids, halogen-substituted isophthalic acids, halogen-substituted terephthalic acids and mixtures thereof with a diamine selected from the group consisting of primary aliphatic diamines and primary aralkyl diamines, said diester and said diamine being reacted in approximately equivalent amounts, with intensive stirring in the presence of an inert aromatic hydrocarbon solvent for the reactants at temperatures of from about 20° to 150° C. to give a preliminary condensate insoluble in said solvent and subsequently recondensing said preliminary condensate by heating it to a temperature of from about 170° to 350° C. until the desired degree of polymerization has been obtained.

2. The process of claim 1, wherein the recondensation is carried out under pressure.

3. The process of claim 1, wherein said diester is diphenyl isophthalate and said diamine is hexamethylenediamine.

4. The process of claim 1, wherein said diester is diphenyl terephthalate and said diamine is hexamethylenediamine.

5. The process of claim 1, wherein said diester is a mixture of 60 to 80 mole percent of diphenyl isophthalate and 40 to 20 mole percent of diphenyl terephthalate and said diamine is hexamethylenediamine.

6. A process for the preparation of polyamides of isophthalic acid, terephthalic acid and mixtures thereof in finely grained form which comprises reacting a diester selected from the group consisting of diphenyl diesters and alkyl-substituted diphenyl diesters of an acid selected from the group consisting of isophthalic acid, terephthalic acid, alkyl-substituted isophthalic acids, alkyl-substituted terephthalic acids, halogen-substituted isophthalic acids, halogen-substituted terephthalic acids and mixtures thereof with a diamine selected from the group consisting of primary aliphatic diamines and primary aralkyl diamines, said diester and said diamine being reacted in approximately equivalent amounts, with intensive stirring in the presence of an inert aromatic hydrocarbon solvent for the reactants at temperatures of from about 20° to 150° C. to give a preliminary condensate insoluble in said solvent and subsequently recondensing said preliminary condensate by heating it to a temperature of from about 170° to 350° C., while replacing said solvent by a non-solvent for the polyamide by adding said non-solvent to the reaction mixture as the solvent distills off, until the desired degree of polymerization has been obtained.

7. The process of claim 6, wherein said non-solvent is higher boiling than said solvent.

8. The process of claim 6, wherein said non-solvent is an aliphatic hydrocarbon.

References Cited

UNITED STATES PATENTS

| | | | |
|---|---|---|---|
| 2,130,948 | 9/1938 | Carothers | 260—78 |
| 2,987,507 | 6/1961 | Levine | 260—78 |
| 3,194,794 | 7/1965 | Caldwell et al. | 260—78 |
| 3,232,909 | 2/1966 | Werner | 260—78 |

FOREIGN PATENTS 614,625  12/1948  Great Britain.

WILLIAM H. SHORT, *Primary Examiner.*

H. D. ANDERSON, *Assistant Examiner.*